United States Patent
Teach

[11] 3,890,134
[45] June 17, 1975

[54] PHENOXY ACETALS AND THEIR UTILITY AS HERBICIDES

[75] Inventor: Eugene G. Teach, El Cerrito, Calif.

[73] Assignee: Stauffer Chemical Company, Westport, Conn.

[22] Filed: Aug. 3, 1973

[21] Appl. No.: 385,513

Related U.S. Application Data

[62] Division of Ser. No. 124,541, March 15, 1971, Pat. No. 3,780,104.

[52] U.S. Cl. ............ 71/100; 71/99; 71/111; 71/118; 71/120
[51] Int. Cl. ............................................. A01n 9/12
[58] Field of Search ............. 71/120, 100, 111, 118, 71/99

[56] References Cited
UNITED STATES PATENTS

| | | | |
|---|---|---|---|
| 3,642,891 | 2/1972 | Teach | 71/120 |
| 3,746,741 | 7/1973 | Hubele | 71/120 |

Primary Examiner—James O. Thomas, Jr.
Attorney, Agent, or Firm—Harry A. Pacini; Daniel C. Block; Edwin H. Baker

[57] ABSTRACT

Meta-phenoxy acetals having the formula

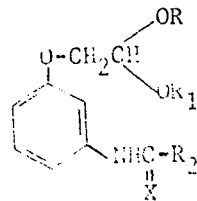

in which X is oxygen or sulfur, R and $R_1$ are independently lower alkyl, R and $R_1$ taken together are ethylene or trimethylene, $R_2$ is alkyl, monocyclohexylamino, monoalkylamino, monoalkenylamino, dialkylamino, alkoxy, alkylthio, haloalkyl, substituted-phenyl wherein said substituents are methyl, monochloro or dichloro. The compounds are useful as herbicides.

27 Claims, No Drawings

PHENOXY ACETALS AND THEIR UTILITY AS HERBICIDES

This is a division of application Ser. No. 124,541 filed Mar. 15, 1971 now U.S. Pat. No. 3,780,104, issued Dec. 18, 1973.

This invention relates to certain novel amide and urea substituted meta-phenoxy acetals which are useful as herbicides. The compounds of the present invention are new compositions of matter and correspond to the general formula

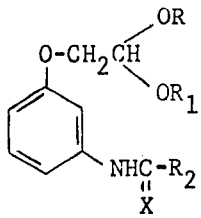

in which X is oxygen or sulfur, R and $R_1$ are independently lower alkyl, R and $R_1$ taken together are ethylene or trimethylene, $R_2$ is alkyl, monocyclohexylamino, monoalkylamino, monoalkenylamino, dialkylamino, alkoxy, alkylthio, haloalkyl, substituted-phenyl wherein said substituents are methyl, monochloro or dichloro.

In the above description, the following preferred embodiments are intended for the various substituent groups: for R and $R_1$, lower alkyl preferably includes, unless otherwise provided for, those members which contain from 1 to 4 carbon atoms, inclusive, in both straight chain and branched chain configurations, for example, methyl, ethyl, n-propyl, isopropyl, n-butyl, sec.-butyl and isobutyl; for $R_2$, alkyl preferably includes those members which contain from 1 to 8 carbon atoms in straight and branched chain configurations, for example, methyl, ethyl, n-propyl, isopropyl, n-butyl, sec.-butyl, amyl, isoamyl, n-hexyl, isohexyl, 2,4,4-trimethylpentyl, 1,1-dimethylbutyl, 1-methylbutyl; the terms alkoxy and alkylthio, preferably includes those members of the groups which contain from 1 to 6 carbon atoms, such as methoxy, ethoxy, propoxy, hexoxy, methylthio, ethylthio, propylthio and hexylthio and their isomers in branch chained configurations. The term haloalkyl preferably includes those members of the group which contain 1 to 4 carbon atoms, inclusive, and mono, di, tri, tetra, and penta halogens, either the same or mixed of the group fluorine, chlorine and bromine. Preferably, fluorine and chlorine, such as monochloromethyl, dichloromethyl, trichloromethyl, monofluoromethyl, difluoromethyl, trifluoromethyl, chlorofluoromethyl, dichlorofluoromethyl, difluorochloromethyl, chlorobromomethyl, dibromomethyl, monochloroethyl, 1,1-dichloroethyl, 1,2-chlorofluoroethyl, 1,2-difluoroethyl, pentafluoroethyl, tetrachloromonofluoroethyl, 1-monochloropropyl, 1,2-dichloro-1,2-difluoropropyl, monochlorobutyl, monofluorobutyl, and monobromobutyl and the like. The terms monoalkylamino and dialkylamino, preferably denote the groups

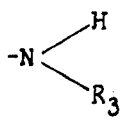 and 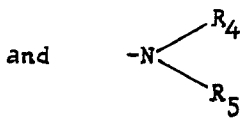

respectively, in which $R_3$, $R_4$ and $R_5$ independently are alkyl groups which contain 1 to 6 carbon atoms, inclusive, in either straight chain or branched chain configurations, for example, methyl, ethyl, n-propyl, isopropyl, n-butyl, sec.-butyl, amyl, isoamyl, n-hexyl and isohexyl. The term monoalkenylamino, preferably includes those members which contain 2 to 4 carbon atoms, inclusive, that is, wherein the alkenyl substituent contains at least one double bond and contains 2 to 4 carbon atoms, inclusive, such as vinyl, alkyl, propenyl-1, butenyl-1, butenyl-2 and the like.

The compounds of this invention have been found to be active herbicides of a general type. That is, certain members of the class have been found to be herbicidally effective against a wide range of plant species. A method of controlling undesirable vegetation of the present invention comprises applying an herbicidally effective amount of the abovedescribed compounds to the area or plant locus where control is desired.

An herbicide is used herein to mean a compound which controls or modifies the growth of plants. By a "growth controlling amount" is meant an amount of compound which causes a modifying effect upon the growth of plants. Such modifying effects include all deviations from natural development, for example, killing, retardation, defoliation, desiccation, regulation, stunting, tillering, stimulation, dwarfing and the like. By "plants" it is meant germinant seeds, emerging seedlings, and established vegetation, including the roots and above-ground portions.

The compounds of the present invention are prepared by several different methods, depending upon the nature of the starting materials and the products desired. For example, two preferred routes to obtain the instant compounds are as follows. The acetaldehyde acetal group is introduced into meta-aminophenol to yield a meta-amino acetal intermediate. This intermediate is further reacted with a suitable acid chloride, chloroformate or isocyanate to yield the desired substituted anilide, carbanilate or urea phenoxy acetal, according to scheme I.

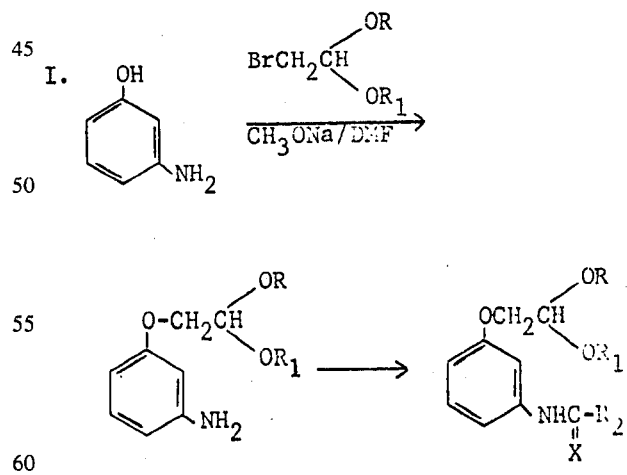

in which X, R, $R_1$ and $R_2$ have the meanings given hereinabove. The reaction according to scheme II can also be employed wherein the meta-hydroxy anilide, carbanilate or urea is first prepared utilizing meta-aminophenol and the suitable acid chloride, chloroformate or isocyanate. The resulting m-hydroxy anilide, carbamate or urea is treated with a haloacetaldehyde acetal to yield the desired compounds of this invention.

II. 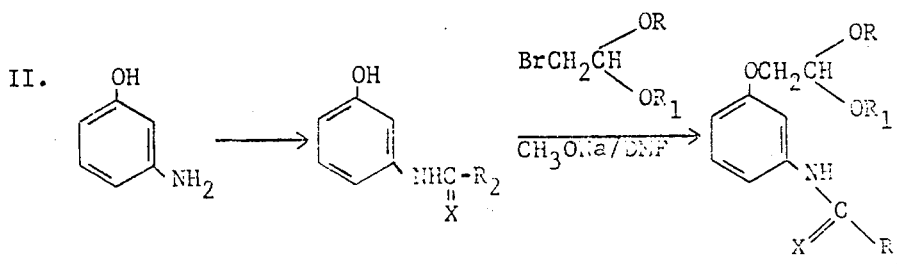

in which X, R, $R_1$ and $R_2$ have the meanings given hereinabove.

The reactions proceed readily in the liquid phase. The employment of a solvent is also useful, facilitating processing, as well as agitation of the reactants. Solvents such as acetone are conveniently employed. The reactions are carried out at temperatures that permit operation in the liquid phase. The temperatures are between about room temperature and reflux temperature of the solvent, if a solvent is employed. In each instance, after the reaction is complete, the recovery of the product is carried out by normal work-up procedures such as crystallization, sublimation or distillation.

The compounds of the present invention and their preparation are more particularly illustrated by the following examples. Following the examples is a table of compounds which are prepared according to the procedures described herein.

EXAMPLE I

Preparation of Intermediate: m-aminophenoxy acetaldehydediethylacetal. m-Aminophenol, 109 g., is dissolved in 500 ml. of dimethyl formamide and 216 g. of 25% sodium methoxide in methanol is added and the excess methanol stripped off under vacuum. Bromoacetaldehyde diethylacetal, 200 g., is added and the mixture heated at reflux for 5 hours and then poured into water. The product is taken up in methylene chloride, washed with dilute base and water, dried over anhydrous magnesium sulfate and the solvent stripped under vacuum. The yield of the title compound is 130 g., $n_D^{30} = 1.5151$.

The dimethyl acetal is prepared similarly from chloroacetaldehyde dimethylacetal.

EXAMPLE II

Preparation of m-propionamidophenoxy acetaldehydediethylacetal. Nine and nine-tenths grams of 3-hydroxy propionanilide is dissolved in 100 ml. of dimethylformamide, 13 g. of 25% sodium methoxide in methanol is added. This is followed by 11.8 g. of bromoacetaldehyde diethylacetal and the mixture is heated at reflux for 8 hours, stirred for an additional 16 hours and then poured into water. The product is taken up in methylene chloride, washed with dilute base and acid, dried over magnesium sulfate and the solvent removed under vacuum. The yield of the title compound is 9 g., $n_D^{30} = 1.5160$.

EXAMPLE III

Preparation of m-methylureidophenoxy acetaldehydedimethylacetal. Thirteen and eight-tenths grams of m-aminophenoxy acetaldehydedimethylacetal is dissolved in 100 ml. of acetone, 4.5 g. of methylisocyanate is added and the mixture heated at reflux for an hour. The solvent is stripped under vacuum. There is obtained 17.4 g. of the title compound, $n_D^{30} = 1.5388$.

EXAMPLE IV

Preparation of m-propionamidophenoxy acetaldehydedimethylacetal. Thirteen and eight-tenths grams of m-aminophenoxy acetaldehydedimethylacetal is dissolved in 100 g. of acetone and 7.5 g. of triethylamine and 6.6 g. of propionylchloride is added portionwise with cooling and stirring. The mixture is poured into water, the product taken up in methylene chloride, dried over magnesium sulfate and the solvent stripped under vacuum. The yield of the title compound is 15.9 g., $n_D^{30} = 1.5220$.

EXAMPLE V

Preparation of m-S-methylthiocarbamylphenoxy acetaldehydediethylacetal. Eleven and three-tenths grams of m-aminophenoxy acetaldehydediethylacetal is dissolved in 100 ml. of acetone and 6.5 g. of triethylamine. The mixture is cooled in a water bath and 6.7 g. of methyl chlorothioformate is added portionwise. After addition is complete, the mixture is poured into approximately 500 ml. of water and the product taken up with methylene chloride, dried over magnesium sulfate and the solvent removed under vacuum. The yield of the title compound is 12 g., $n_D^{30} = 1.5355$.

The following is a table of the illustrative compounds which are prepared according to the aforementioned procedures. Compound numbers have been assigned to them and are used for identification throughout the balance of the specification.

| COMPOUND NUMBER | X | R | $R_1$ | $R_2$ | m.p. °C. or $n_D^{30}$ |
|---|---|---|---|---|---|
| 1 | O | $C_2H_5$ | $C_2H_5$ | $C_2H_5-$ | 1.5160 |
| 2 | O | $C_2H_5$ | $C_2H_5$ | $i-C_3H_7-$ | 1.5047 |
| 3 | O | $C_2H_5$ | $C_2H_5$ | $t-C_4H_9-$ | 1.4970 |
| 4 | O | $C_2H_5$ | $C_2H_5$ | $C_3H_7CH(CH_3)-$ | 1.4950 |
| 5 | O | $C_2H_5$ | $C_2H_5$ | $C_3H_7C(CH_3)_2-$ | 1.4938 |
| 6 | O | $C_2H_5$ | $C_2H_5$ | $CH_3NH-$ | 1.5215 |
| 7 | O | $C_2H_5$ | $C_2H_5$ | $(CH_3)_2N-$ | 1.5184 |
| 8 | O | $C_2H_5$ | $C_2H_5$ | $C_2H_5NH-$ | 1.5179 |
| 9 | O | $C_2H_5$ | $C_2H_5$ | $n-C_4H_9NH-$ | 1.5066 |
| 10 | S | $C_2H_5$ | $C_2H_5$ | $CH_3NH-$ | 1.5367 |
| 11 | O | $C_2H_5$ | $C_2H_5$ | $CH_3O-$ | 1.5083 |
| 12 | O | $C_2H_5$ | $C_2H_5$ | $CH_3S-$ | 1.5355 |
| 13 | O | $CH_3$ | $CH_3$ | $C_2H_5-$ | 1.5220 |
| 14 | O | $CH_3$ | $CH_3$ | $C_3H_7CH(CH_3)-$ | 1.5098 |
| 15 | O | $CH_3$ | $CH_3$ | $CH_3NH-$ | 1.5388 |
| 16 | O | $CH_3$ | $CH_3$ | $(CH_3)_2N-$ | 1.5320 |
| 17 | O | $CH_3$ | $CH_3$ | $n-C_4H_9NH-$ | 1.5270 |
| 18 | O | $CH_3$ | $CH_3$ | $CH_3O-$ | 1.5200 |
| 19 | O | $CH_3$ | $CH_3$ | $CH_3S-$ | 1.5532 |
| 20 | O | $CH_3$ | $CH_3$ | $C_2F_5-$ | 1.5560 |
| 21 | O | $CH_3$ | $CH_3$ | $i-C_3H_7-$ | 1.5103 |

TABLE I—Continued

| COMPOUND NUMBER | X | R | $R_1$ | $R_2$ | m.p. °C. or $n_D^{30}$ |
|---|---|---|---|---|---|
| 22 | O | $CH_3$ | $CH_3$ | $t-C_4H_9-$ | 1.5115 |
| 23 | O | $CH_3$ | $CH_3$ | $C_3H_7C(CH_3)_2-$ | 1.5044 |
| 24 | O | $CH_3$ | $CH_3$ | $C_2H_5NH-$ | 1.5280 |
| 25 | O | $CH_3$ | $CH_3$ | $n-C_3H_7NH-$ | 1.5253 |
| 26 | O | $CH_3$ | $CH_3$ | $i-C_3H_7NH-$ | 1.5267 |
| 27 | O | $CH_3$ | $CH_3$ | $CH_2=CHCH_2NH-$ | 1.5362 |
| 28 | O | $CH_3$ | $CH_3$ | $t-C_4H_9NH-$ | 1.5205 |
| 29 | O | $CH_3$ | $CH_3$ | $c-C_6H_{11}NH-$ | 1.5310 |
| 30 | O | $CH_3$ | $CH_3$ | $o-CH_3-C_6H_4-$ | 90–92°C. |
| 31 | O | $CH_3$ | $CH_3$ | $m-Cl-C_6H_4-$ | 1.5731 |
| 32 | O | $CH_3$ | $CH_3$ | $2,4-Cl_2C_6H_4-$ | 1.5908 |
| 33 | O | $CH_3$ | $CH_3$ | $i-C_3H_7O-$ | 1.5138 |
| 34 | O | $CH_3$ | $CH_3$ | $C_2H_5S-$ | 1.5373 |
| 35 | O | $CH_3$ | $CH_3$ | $i-C_3H_7S-$ | 1.5320 |
| 36 | O | $CH_3$ | $CH_3$ | $t-C_4H_9S-$ | 1.5218 |
| 37 | O | $-CH_2CH_2-$ | | $C_2H_5-$ | |
| 38 | O | $-CH_2CH_2-$ | | $i-C_3H_7-$ | |
| 39 | O | $-CH_2CH_2-$ | | $C_3H_7CH(CH_3)-$ | |
| 40 | O | $-CH_2CH_2-$ | | $C_3H_7C(CH_3)_2-$ | |
| 41 | O | $-CH_2CH_2-$ | | $CH_3NH-$ | |
| 42 | O | $-CH_2CH_2-$ | | $(CH_3)_2N-$ | |
| 43 | O | $-CH_2CH_2-$ | | $CH_3O-$ | |
| 44 | O | $-CH_2CH_2-$ | | $CH_3S-$ | |
| 45 | S | $-CH_2CH_2-$ | | $CH_3NH-$ | |
| 46 | O | $-CH_2CH_2CH_2-$ | | $C_2H_5-$ | |
| 47 | O | $-CH_2CH_2CH_2-$ | | $i-C_3H_7$ | |
| 48 | O | $-CH_2CH_2CH_2-$ | | $C_3H_7CH(CH_3)-$ | |
| 49 | O | $-CH_2CH_2CH_2-$ | | $C_3H_7C(CH_3)_2-$ | |
| 50 | O | $-CH_2CH_2CH_2-$ | | $CH_3NH-$ | |
| 51 | O | $-CH_2CH_2CH_2-$ | | $(CH_3)_2N-$ | |
| 52 | O | $-CH_2CH_2CH_2-$ | | $CH_3O-$ | |
| 53 | O | $-CH_2CH_2CH_2-$ | | $CH_3S-$ | |
| 54 | S | $-CH_2CH_2CH_2-$ | | $CH_3NH-$ | |

HERBICIDAL SCREENING TESTS

As previously mentioned, the herein-described compounds produced in the above-described manner are phytotoxic compounds which are useful and valuable in controlling various plant species. Compounds of this invention are tested as herbicides in the following manner.

Pre-emergence herbicide test. On the day preceding treatment, seeds of seven different weed species are planted in individual rows using one species per row across the width of the flat. The seeds used are hairy crabgrass (*Digitaris sanguinalis* (L.) Scop.), yellow foxtail (*Setaria glauca* (L.) Beauv.), watergrass (*Echinochloa crusgalli* (L.) Beauv.), California red oat (*Avena sativa* (L.)), redroot pigweed (*Amaranthus retroflexus* (L.)), Indian mustard (*Brassica juncea* (L.) Coss.) and curly dock (*Rumex crispus* (L.)). Ample seeds are planted to give about 20 to 50 seedlings per row, after emergence, depending on the size of the plants. The flats are watered after planting. The spraying solution is prepared by dissolving 50 mg. of the test compound in 3 ml. of a solvent, such as acetone, containing 1% Tween 20 (polyoxyethylene sorbitan monolaurate). The following day each flat is sprayed at the rate of 20 pounds of the candidate compound per 80 gallons of solution per acre. An atomizer is used to spray the solution onto the soil surface. The flats are placed in a greenhouse at 80°F. and watered regularly. Two weeks later the degree of weed control is determined by comparing the amount of germination and growth of each weed in the treated flats with weeds in several untreated control flats. The rating system is as follows:

0 = no significant injury (approximately 0–10 per cent control)

3 = slight injury (approximately 10–40 per cent control)

6 = moderate injury (approximately 40–70 per cent control)

9 = severe injury or death (approximately 70–100 per cent control)

An activity index is used to represent the total activity on all seven weed species. The activity index is the sum of the numbers divided by 3, so that an activity index of 21 represents complete control of all seven weeds. The results of this test are reported in Table II.

Post-emergence herbicide test. Seeds of five weed species, including hairy crabgrass, watergrass, California red oats, Indian mustard, and curly dock and one crop, pinto beans (*Phaseolus vulgaris*), are planted in flats as described above for pre-emergence screening. The flats are placed in the greenhouse at 72°–85°F. and watered daily with a sprinkler. About 10 to 14 days after planting, when the primary leaves of the bean plant are almost fully expanded and the first trifoliate leaves are just starting to form, the plants are sprayed. The spray is prepared by weighing out 50 mg. of the test compound, dissolving it in 5 ml. of acetone containing 1% Tween 20 (polyoxyethylene sorbitan monolaurate) and then adding 5 ml. of water. The solution is sprayed on the foliage using an atomizer. The spray concentration is 0.5% and the rate would be approximately 20 lb/acre if all of the spray were retained on the plant and the soil, but some spray is lost, so it is estimated that the application rate is approximately 12.5 lb/acre.

Beans are used to detect defoliants and plant growth regulators. The beans are trimmed to two or three plants per flat by cutting off the excess weaker plants several days before treatment. The treated plants are placed back in the greenhouse and care is taken to avoid sprinkling the treated foliage with water for three days after treatment. Water is applied to the soil by means of a slow stream from a watering hose, taking care not to wet the foliage.

Injury rates are recorded 14 days after treatment. The rating system is the same as described above for the pre-emergence test where (0), (3), (6), and (9) are used for the different rates of injury and control. The injury symptoms are also recorded. The maximum activity index for complete control of all the species in the post-emergence screening test is 18. This index represents the sum of the rating numbers obtained with the six plant species used in the test divided by 3. The herbicide activity index is shown in Table II.

TABLE II

HERBICIDAL ACTIVITY SCREENING RESULTS

| COMPOUND NUMBER | HERBICIDAL ACTIVITY INDEX** Pre-emergence (20 lb/A) | Post-emergence (12.5 lb/A) |
|---|---|---|
| 1 | 18 | 17 |
| 2 | 18 | 17 |
| 3 | 13 | 15 |
| 4 | 17 | 18 |
| 5 | 14 | 18 |
| 6 | 18 | 18 |
| 7 | 19 | 18 |
| 8 | 17 | 17 |
| 9 | 18 | 18 |

TABLE II-Continued

HERBICIDAL ACTIVITY SCREENING RESULTS

| COMPOUND NUMBER | HERBICIDAL ACTIVITY INDEX** | |
|---|---|---|
| | Pre-emergence (20 lb/A) | Post-emergence (12.5 lb/A) |
| 10 | 6 | 13 |
| 11 | 10 | 17 |
| 12 | 17 | 17 |
| 13 | 19 | 17 |
| 14 | 19 | 18 |
| 15 | 21 | 18 |
| 16 | 17 | 18 |
| 17 | 19 | 18 |
| 18 | 12 | 15 |
| 19 | 19 | 18 |
| 20 | 7 | 11 |
| 21 | 9 | 15 |
| 22 | 14 | 15 |
| 23 | 16 | 18 |
| 24 | 7 | 14 |
| 25 | 10 | 16 |
| 26 | 6 | 15 |
| 27 | 9 | 18 |
| 28 | 9 | 15 |
| 29 | 4 | 14 |
| 30 | 0 | 4 |
| 31 | 0 | 7 |
| 32 | 3 | 11 |
| 33 | 5 | 11 |
| 34 | 0 | 11 |
| 35 | 0 | 6 |
| 36 | 1 | 8 |

**21 = 70-100% control of all seven plant species tested pre-emergence.
18 = 70-100% control of all six plant species tested post-emergence.

The compounds of the present invention are used as pre-emergence or post-emergence herbicides and are applied in a variety of ways at various concentrations. In practice, the compounds are formulated with an inert carrier, utilizing methods well-known to those skilled in the art, thereby making them suitable for application as dusts, sprays, or drenches and the like, in the form and manner required. The mixtures can be dispersed in water with the aid of a wetting agent or they can be employed in organic liquid compositions, oil and water, water in oil emulsions, with or without the addition of wetting, dispersing or emulsifying agents. An herbicidally effective amount depends upon the nature of the seeds or plants to be controlled and the rate of application varies from 1 to approximately 50 pounds per acre.

The phytotoxic compositions of this invention employing an herbicidally effective amount of the compounds described herein are applied to the plants in the conventional manner. Thus, the dust and liquid compositions can be applied to the plant by the use of power-dusters, boom and hand sprayers and spray-dusters. The compositions can also be applied from airplanes as a dust or a spray because they are effective in very low dosages. In order to modify or control growth of germinating seeds or emerging seedlings, as a typical example, the dust and liquid compositions are applied to the soil according to conventional methods and are distributed in the soil to a depth of at least one-half inch below the soil surface. It is not necessary that the phytotoxic compositions be admixed with the soil particles, since these compositions can be applied merely by spraying or sprinkling the surface of the soil. The phytotoxic compositions of this invention can also be applied by addition to irrigation water supplied to the field to be treated. This method of application permits the penetration of the compositions into the soil as the water is absorbed therein. Dust compositions, granular compositions or liquid formulations applied to the surface of the soil can be distributed below the surface of the soil by conventional means such as discing, dragging or mixing operations.

The phytotoxic compositions of this invention can also contain other additaments, for example, fertilizers, pesticides and the like, used as adjuvant or in combination with any of the above-described adjuvants. Other phytotoxic compounds useful in combination with the above-described compounds include, for example, 2,4-dichlorophenoxyacetic acids, 2,4,5-trichloro-phenoxyacetic acid, 2-methyl-4-chlorophenoxyacetic acid and the salts, esters and amides thereof; triazine derivatives, such as 2,4-bis(3-methoxypropylamino)-6-methylthio-S-triazine; 2-chloro-4-ethylamino-6-isopropylamino-S-triazine, and 2-ethylamino-4-isopropylamino-6-methylmercapto-S-triazine, urea derivatives, such as 3-(3,4-dichlorophenyl)-1,1-dimethyl urea and 3-(p-chlorophenyl)-1,1-dimethyl urea and acetamides such as N,N-diallyl-α-chloroacetamide, and the like; benzoic acids such as 3-amino-2,5-dichlorobenzoic; and thiocarbamates, such as S-propyl dipropylthiocarbamate; S-ethyl-dipropylthiocarbamate, S-ethyl-cyclohexyl-ethyl-thiocarbamate, S-ethyl hexahydro-1H-azepine-1-carbothioate and the like. Fertilizers useful in combination with the active ingredients include, for example, ammonium nitrate, urea and superphosphate. Other useful additaments include materials in which plant organisms take root and grow, such as compost, manure, humus, sand and the like.

The concentration of a compound of the present invention, constituting an effective amount in the best mode of administration in the utility disclosed, is readily determinable by those skilled in the art.

Various changes and modifications are possible without departing from the spirit and scope of the invention described herein and will be apparent to those skilled in the art to which it pertains. It is accordingly intended that the present invention shall only be limited by the scope of the claims.

What is claimed is:

1. A method for controlling the growth of vegetation which comprises applying to the locus wherein control is desired, an herbicidally effective amount of the compound of the formula

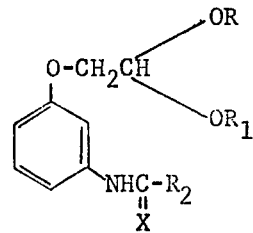

in which X is oxygen; R and $R_1$ are independently lower alkyl; $R_2$ is alkyl, or haloalkyl.

2. A method according to claim 1 in which $R_2$ is alkyl.

3. A method according to claim 2 in which R and $R_1$ are each ethyl and $R_2$ is ethyl.

4. A method according to claim 2 in which R and $R_1$ are each ethyl and $R_2$ is isopropyl.

5. A method according to claim 2 in which R and $R_1$ are each ethyl and $R_2$ is tert.-butyl.

6. A method according to claim 2 in which R and $R_1$ are each ethyl and $R_2$ is 1-methylbutyl.

7. A method according to claim 2 in which R and $R_1$ are each ethyl and $R_2$ is 1,1-dimethylbutyl.

8. A method according to claim 2 in which R and $R_1$ are each methyl and $R_2$ is ethyl.

9. A method according to claim 2 in which R and $R_1$ are each methyl and $R_2$ is 1-methylbutyl.

10. A method according to claim 2 in which R and $R_1$ are each methyl and $R_2$ is 1,1-dimethylbutyl.

11. A method according to claim 1 in which X is oxygen and $R_2$ is monoalkylamino.

12. A method according to claim 11 in which R and $R_1$ are each ethyl and $R_2$ is methylamino.

13. A method according to claim 11 in which R and $R_1$ are each ethyl and $R_2$ is ethylamino.

14. A method according to claim 11 in which R and $R_1$ are each ethyl and $R_2$ is n-butylamino.

15. A method according to claim 11 in which R and $R_1$ are each methyl and $R_2$ is methylamino.

16. A method according to claim 11 in which R and $R_1$ are each methyl and $R_2$ is n-butylamino.

17. A method according to claim 1 in which X is oxygen and $R_2$ is dialkylamino.

18. A method according to claim 17 in which R and $R_1$ are each ethyl and $R_2$ is dimethylamino.

19. A method according to claim 17 in which R and $R_1$ are each methyl and $R_2$ is dimethylamino.

20. A method according to claim 1 in which X is oxygen, R and $R_1$ are each methyl and $R_2$ is pentafluoroethyl.

21. A method according to claim 1 in which X is oxygen and $R_2$ is alkoxy.

22. A method according to claim 21 in which R and $R_1$ are each ethyl and $R_2$ is methoxy.

23. A method according to claim 21 in which R and $R_1$ are each methyl and $R_2$ is methoxy.

24. A method according to claim 1 in which X is oxygen and $R_2$ is alkylthio.

25. A method according to claim 24 in which R and $R_1$ are each ethyl and $R_2$ is methylthio.

26. A method according to claim 24 in which R and $R_1$ are each methyl and $R_2$ is methylthio.

27. A method according to claim 24 in which R and $R_1$ are each methyl and $R_2$ is ethylthio.

* * * * *